US012609519B2

(12) United States Patent
Kogure et al.

(10) Patent No.: US 12,609,519 B2
(45) Date of Patent: Apr. 21, 2026

(54) WIRE HARNESS

(71) Applicant: Yazaki Corporation, Tokyo (JP)

(72) Inventors: Naoto Kogure, Shizuoka (JP); Hikaru Sano, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 224 days.

(21) Appl. No.: 18/736,875

(22) Filed: Jun. 7, 2024

(65) Prior Publication Data

US 2024/0332940 A1      Oct. 3, 2024

Related U.S. Application Data

(63) Continuation of application No. PCT/JP2023/005658, filed on Feb. 17, 2023.

(30) Foreign Application Priority Data

Feb. 28, 2022      (JP) ................................. 2022-028845

(51) Int. Cl.
*H02G 11/00* (2006.01)
*B60R 16/02* (2006.01)
*H01B 7/00* (2006.01)

(52) U.S. Cl.
CPC ......... *H02G 11/00* (2013.01); *B60R 16/0215* (2013.01); *H01B 7/0045* (2013.01)

(58) Field of Classification Search
None
See application file for complete search history.

(56) References Cited

U.S. PATENT DOCUMENTS

| | | | |
|---|---|---|---|
| 11,766,974 B2 * | 9/2023 | Long ..................... | B60R 16/027 |
| | | | 174/72 A |
| 11,780,387 B2 * | 10/2023 | Kitahara .............. | H02G 3/0456 |
| | | | 174/72 A |
| 2005/0095903 A1 * | 5/2005 | Stenzel ................ | H02G 3/0475 |
| | | | 439/501 |
| 2007/0148992 A1 * | 6/2007 | Sato ..................... | B60R 16/0207 |
| | | | 439/34 |
| 2007/0148994 A1 * | 6/2007 | Sato ..................... | B60R 16/0215 |
| | | | 439/34 |
| 2014/0332265 A1 * | 11/2014 | Nagayasu .............. | H02G 11/00 |
| | | | 174/72 A |

(Continued)

FOREIGN PATENT DOCUMENTS

JP        2021-019386 A      2/2021

*Primary Examiner* — Krystal Robinson
(74) *Attorney, Agent, or Firm* — Sughrue Mion, PLLC

(57) ABSTRACT

A harness body includes a first routed portion routed to an other end portion of a first arm member on a first coupling target side and a third routed portion guided toward a fixed portion on a second coupling target side by a harness guide tool and having a fixing portion fixed to the fixed portion, a link mechanism includes a second arm member including an other end portion relatively rotatably coupled to the other end portion of the first arm member via a second rotation shaft, and the third routed portion is bent and deformed between the harness guide tool and the fixing portion when the first arm member is relatively rotated about an axis of a first rotation shaft or when the second arm member is relatively rotated about an axis of a third rotation shaft with respect to the second coupling target.

16 Claims, 5 Drawing Sheets

(56)      References Cited

U.S. PATENT DOCUMENTS

| 2021/0016725 | A1 | | 1/2021 | Yamashita et al. | |
|---|---|---|---|---|---|
| 2023/0271568 | A1 | * | 8/2023 | Maruchi | H02G 3/03 |
| | | | | | 174/72 A |
| 2023/0271574 | A1 | * | 8/2023 | Kogure | B60R 16/0215 |
| | | | | | 174/72 A |

* cited by examiner

WIRE HARNESS

CROSS-REFERENCE TO RELATED APPLICATION

This application is a continuation application of International Application No. PCT/JP2023/005658 filed on Feb. 17, 2023 which claims the benefit of priority from Japanese Patent Application No. 2022-028845 filed on Feb. 28, 2022 and designating the U.S., the entire contents of which are incorporated herein by reference.

BACKGROUND OF THE INVENTION

1. Field of the Invention

The present invention relates to a wire harness.

2. Description of the Related Art

Conventionally, a vehicle such as an automobile is mounted with a wire harness that electrically connects a power source (secondary battery or the like), an electrical component, or the like on a vehicle body side to a switch, an electrical component, or the like on a slide door side. In this wire harness, a harness body is routed between the vehicle body and the slide door, and the routing path of the harness body changes in conjunction with the opening/closing operation of the slide door. This type of wire harness is disclosed in, for example, Japanese Patent Application Laid-open No. 2021-19386.

Incidentally, in the vehicle, a slide mechanism that performs a sliding operation of the slide door is assembled between the slide door and the vehicle body. For example, in a vehicle, it is conceivable to use a link mechanism passed between the slide door and the vehicle body as the slide mechanism. Then, in this vehicle, it is conceivable to route the harness body along the link mechanism. In this case, in the wire harness, the harness body follows the movement of the link mechanism, but it is not preferable that an overload is applied to the harness body due to excessive bending or the like.

SUMMARY OF THE INVENTION

Therefore, an object of the present invention is to provide a wire harness capable of causing the harness body to follow the movement of the link mechanism without overload.

In order to achieve the above mentioned object, a wire harness according to one aspect of the present invention includes a harness body that includes a first routed portion routed in a link mechanism that couples a first coupling target and a second coupling target, a second routed portion routed on the first coupling target side with respect to the first routed portion, and a third routed portion routed on the second coupling target side with respect to the first routed portion; a harness fixing tool that fixes a fixing portion of the third routed portion to a fixed portion on the second coupling target side provided so as not to cause relative displacement with respect to the second coupling target; and a harness guide tool that restricts a routing path of the third routed portion, wherein the link mechanism includes a first arm member having one end portion coupled to the first coupling target side and an other end portion at which the first routed portion is routed, a second arm member having one end portion coupled to the second coupling target side, a first rotation shaft that enables relative rotation between the first coupling target and the one end portion of the first arm member, a second rotation shaft that is parallel to the first rotation shaft and enables relative rotation between the other end portion of the first arm member to which the harness guide tool is fixed and an other end portion of the second arm member, and a third rotation shaft that is parallel to the first rotation shaft and the second rotation shaft and enables relative rotation between the second coupling target and the one end portion of the second arm member, and enables relative displacement between the first coupling target and the second coupling target along an orthogonal plane with respect to the first rotation shaft, the second rotation shaft, and the third rotation shaft, the harness guide tool guides the third routed portion toward the fixed portion on the second coupling target side located in a direction intersecting the orthogonal plane with respect to the harness guide tool, and the third routed portion is bent and deformed between the harness guide tool and the fixing portion when the first arm member is relatively rotated about an axis of the first rotation shaft with respect to the first coupling target.

In order to achieve the above mentioned object, a wire harness according to another aspect of the present invention includes a harness body that includes a first routed portion routed in a link mechanism that couples a first coupling target and a second coupling target, a second routed portion routed on the first coupling target side with respect to the first routed portion, and a third routed portion routed on the second coupling target side with respect to the first routed portion; a harness fixing tool that fixes a fixing portion of the third routed portion to a fixed portion on the second coupling target side provided so as not to cause relative displacement with respect to the second coupling target; and a harness guide tool that restricts a routing path of the third routed portion, wherein the link mechanism includes a first arm member having one end portion coupled to the first coupling target side and an other end portion at which the first routed portion is routed, a second arm member having one end portion coupled to the second coupling target side, a first rotation shaft that enables relative rotation between the first coupling target and the one end portion of the first arm member, a second rotation shaft that is parallel to the first rotation shaft and enables relative rotation between the other end portion of the first arm member to which the harness guide tool is fixed and an other end portion of the second arm member, and a third rotation shaft that is parallel to the first rotation shaft and the second rotation shaft and enables relative rotation between the second coupling target and the one end portion of the second arm member, and enables relative displacement between the first coupling target and the second coupling target along an orthogonal plane with respect to the first rotation shaft, the second rotation shaft, and the third rotation shaft, the harness guide tool guides the third routed portion toward the fixed portion on the second coupling target side located in a direction intersecting the orthogonal plane with respect to the harness guide tool, and the third routed portion is bent and deformed between the harness guide tool and the fixing portion when the second arm member is relatively rotated about an axis of the third rotation shaft with respect to the second coupling target.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
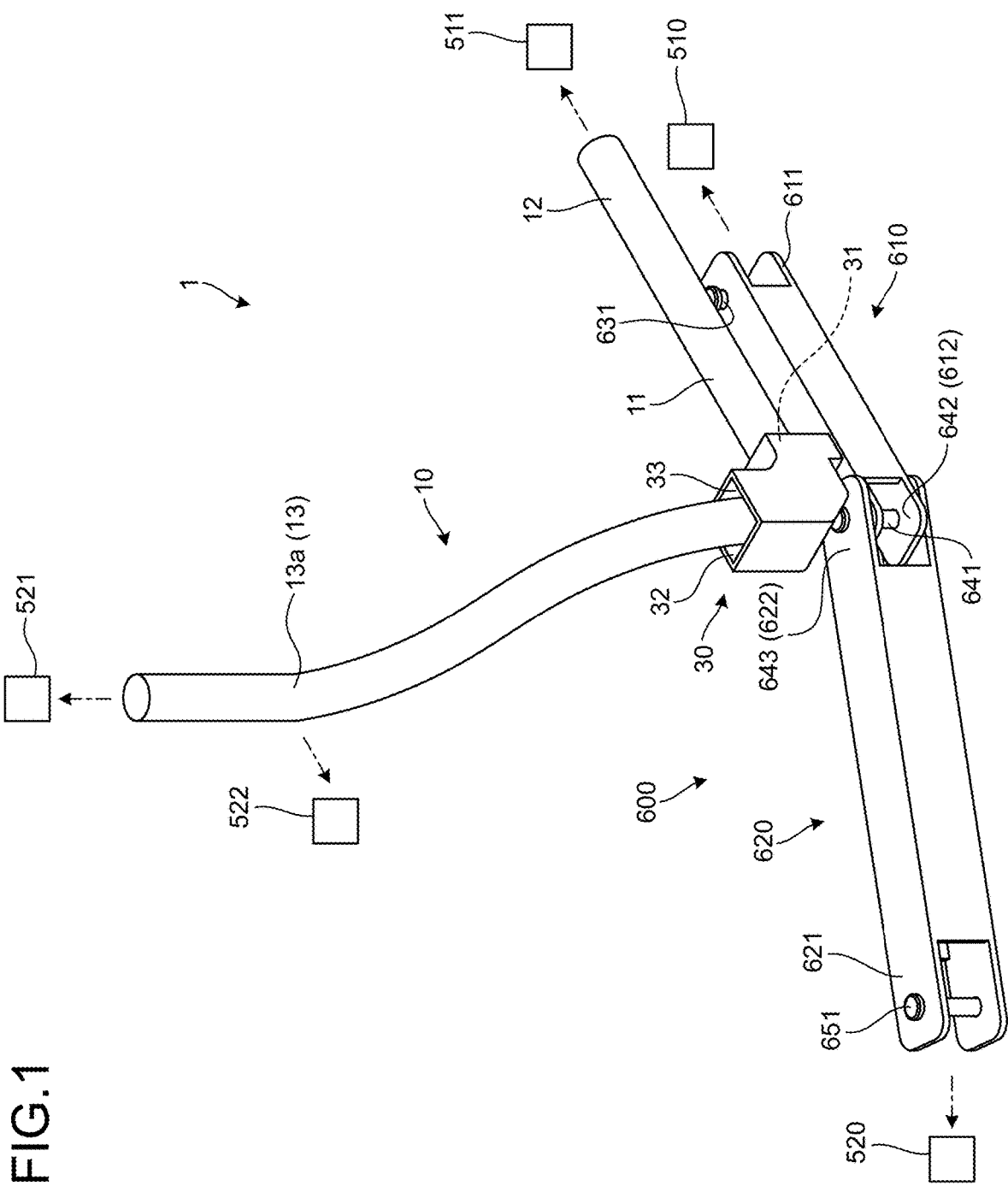
FIG. 1 is a perspective diagram illustrating a wire harness of an embodiment together with a link mechanism.

Hereinafter, an embodiment of the wire harness according to the present invention will be described in detail with reference to the drawings. Note that this invention is not limited by this embodiment.

Embodiment

One embodiment of the wire harness according to the present invention will be described with reference to FIGS. 1 to 5.

Reference numeral 1 in FIGS. 1 to 5 denotes a wire harness of the present embodiment.

A wire harness 1 is routed between a first electrical connection target 511 installed on a first coupling target 510 and a second electrical connection target 521 installed on a second coupling target 520 in order to electrically connect the first electrical connection target 511 and the second electrical connection target 521 (FIG. 1). Here, the first coupling target 510 and the second coupling target 520 are coupled to each other by a link mechanism 600, and the position of an other with respect to one is relatively changed by the link mechanism 600 (FIG. 1). Therefore, the wire harness 1 is routed in the link mechanism 600 and follows the movement of the link mechanism 600. Note that the first electrical connection target 511 and the second electrical connection target 521 may be of any type as long as they electrically connect with each other, for example, a power source such as a secondary battery, a drive device including a rotary machine or the like, an electronic control device, a switch, or the like.

The link mechanism 600 includes a first arm member 610 that couples one end portion 611 to the first coupling target 510 side, and a second arm member 620 that couples one end portion 621 to the second coupling target 520 side (FIGS. 1 to 5).

Figure 3:
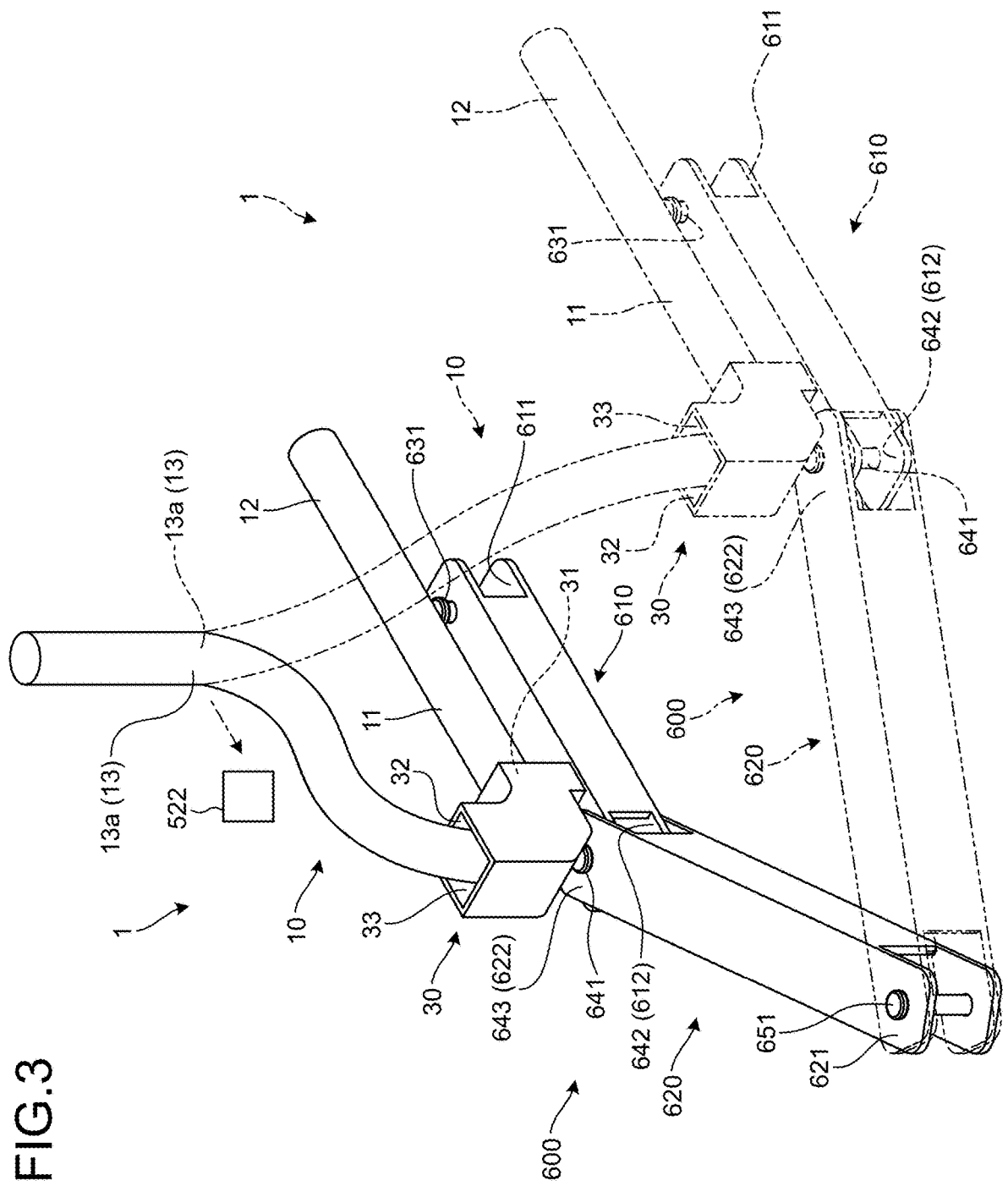
FIG. 3 is a perspective diagram describing bending deformation of a third routed portion.
Figure 5:
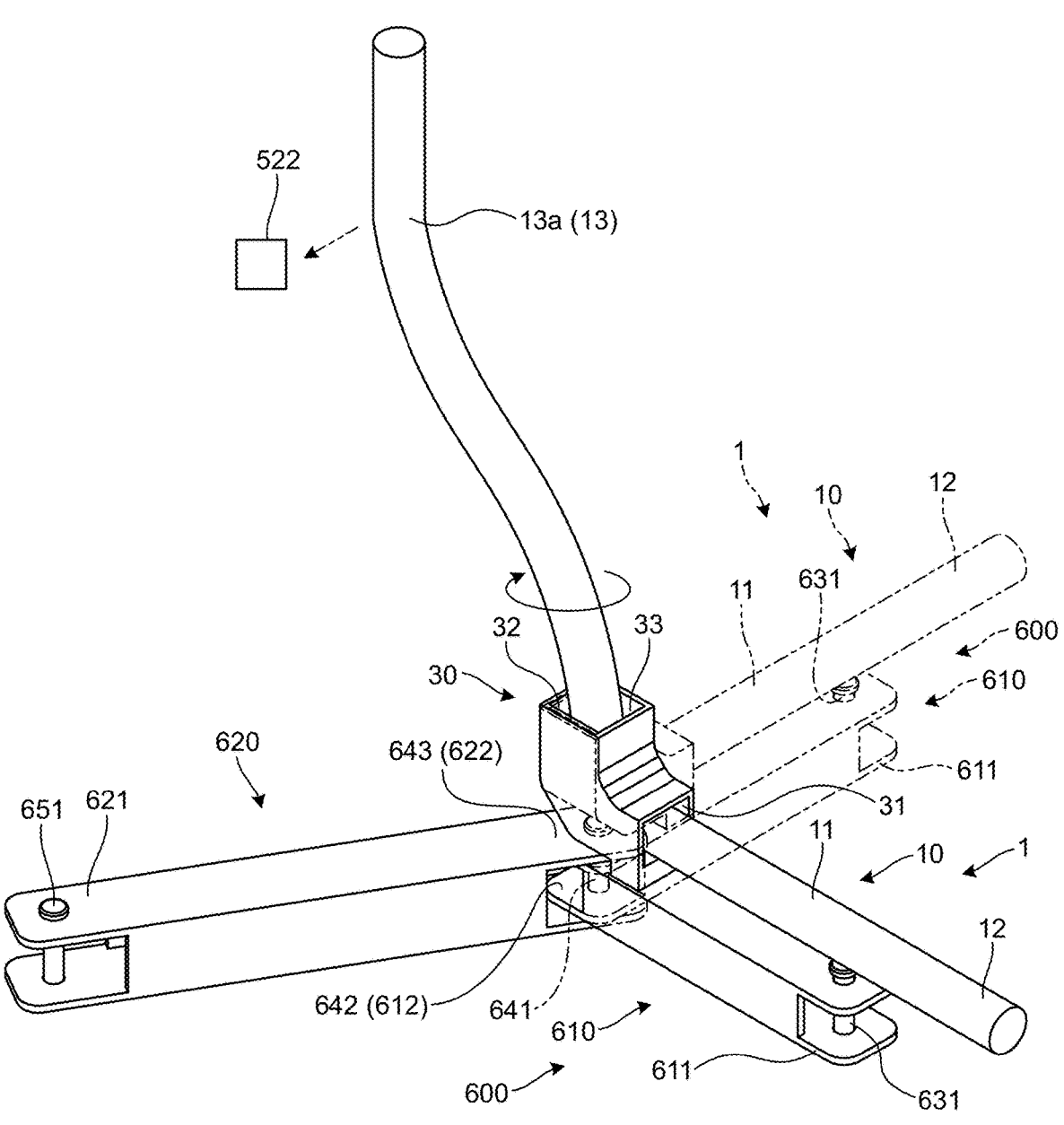
FIG. 5 is a perspective diagram describing twisting deformation of the third routed portion.

Further, the link mechanism 600 includes a first rotation shaft 631 that enables relative rotation between the first coupling target 510 and the one end portion 611 of the first arm member 610, a second rotation shaft 641 that is parallel to the first rotation shaft 631 and enables relative rotation between an other end portion 612 of the first arm member 610 and an other end portion 622 of the second arm member 620, and a third rotation shaft 651 that is parallel to the first rotation shaft 631 and the second rotation shaft 641 and enables relative rotation between the second coupling target 520 and the one end portion 621 of the second arm member 620 (FIGS. 1, 3, and 5).

The link mechanism 600 enables relative displacement between the first coupling target 510 and the second coupling target 520 along an orthogonal plane (hereinafter, referred to as an "operation plane of the link mechanism 600") with respect to the first rotation shaft 631, the second rotation shaft 641, and the third rotation shaft 651.

In the link mechanism 600, for example, output torque of the rotary machine (not illustrated), which is a drive source, is transmitted to either one of the first rotation shaft 631 and the third rotation shaft 651.

The first rotation shaft 631 is fixed to the one end portion 611 of the first arm member 610 without relative displacement, and is operated integrally with the first arm member 610. Then, the link mechanism 600 includes a bearing member (hereinafter, referred to as a "first bearing member") (not illustrated) that is fixed to the first coupling target 510 and rotatably supports the first rotation shaft 631. Hence, the first coupling target 510 and the first arm member 610 are coupled to each other via the first rotation shaft 631 and the first bearing member so as to be capable of relative rotation about the axis of the first rotation shaft 631.

In addition, in the link mechanism 600, a first bearing portion 642 for rotatably supporting the second rotation shaft 641 is provided at the other end portion 612 of the first arm member 610 (FIGS. 1, 3, and 5). Then, in the link mechanism 600, a second bearing portion 643 for rotatably supporting the second rotation shaft 641 is provided at the other end portion 622 of the second arm member 620 (FIGS. 1, 3, and 5). Hence, the first arm member 610 and the second arm member 620 are coupled to each other via the second rotation shaft 641, the first bearing portion 642, and the second bearing portion 643 so as to be capable of relative rotation about the axis of the second rotation shaft 641. Note that, in the link mechanism 600, when the output torque of the drive source is transmitted to the second rotation shaft 641, the second rotation shaft 641 is fixed to the other end portion 612 of the first arm member 610 or the other end portion 622 of the second arm member 620 without relative displacement.

In addition, the third rotation shaft 651 is fixed to the one end portion 621 of the second arm member 620 without relative displacement, and is operated integrally with the second arm member 620. Then, the link mechanism 600 includes a bearing member (hereinafter, referred to as a "second bearing member") (not illustrated) that is fixed to the second coupling target 520 and rotatably supports the third rotation shaft 651. Hence, the second coupling target 520 and the second arm member 620 are coupled to each other via the third rotation shaft 651 and the second bearing member so as to be capable of relative rotation about the axis of the third rotation shaft 651.

The link mechanism 600 can change the relative positions of the first coupling target 510 and the second coupling target 520 by relatively rotating the first coupling target 510 and the first arm member 610 about the axis of the first rotation shaft 631 with respect to each other and relatively rotating the first arm member 610 about the axis of the first rotation shaft 631 with respect to the first coupling target 510. Hereinafter, the operation of the link mechanism 600 is referred to as "first relative rotation operation".

For example, when performing the first relative rotation operation, the link mechanism 600 relatively rotates the first coupling target 510 and the first arm member 610 about the axis of the first rotation shaft 631 with respect to each other, does not relatively rotate the first arm member 610 and the second arm member 620 about the axis of the second rotation shaft 641 with respect to each other, and does not relatively rotate the second coupling target 520 and the second arm member 620 about the axis of the third rotation shaft 651 with respect to each other. In this manner, the link mechanism 600 relatively rotates the first arm member 610 and the second arm member 620 about the axis of the first rotation shaft 631 with respect to the first coupling target 510.

In addition, when performing the first relative rotation operation, the link mechanism 600 may relatively rotate the first coupling target 510 and the first arm member 610 about the axis of the first rotation shaft 631 with respect to each other, may relatively rotate the first arm member 610 and the second arm member 620 about the axis of the second rotation shaft 641 with respect to each other, and may not relatively rotate the second coupling target 520 and the second arm member 620 about the axis of the third rotation shaft 651 with respect to each other. In this manner, the link mechanism 600 relatively rotates the first arm member 610 and the second arm member 620 about the axis of the first rotation shaft 631 with respect to the first coupling target 510.

In addition, when performing the first relative rotation operation, the link mechanism 600 may relatively rotate the first coupling target 510 and the first arm member 610 about the axis of the first rotation shaft 631 with respect to each other, may relatively rotate the second coupling target 520 and the second arm member 620 about the axis of the third rotation shaft 651 with respect to each other, and may not relatively rotate the first arm member 610 and the second arm member 620 about the axis of the second rotation shaft 641 with respect to each other. In this manner, the link mechanism 600 relatively rotates the first arm member 610 and the second arm member 620 about the axis of the first rotation shaft 631 with respect to the first coupling target 510.

Figure 4:
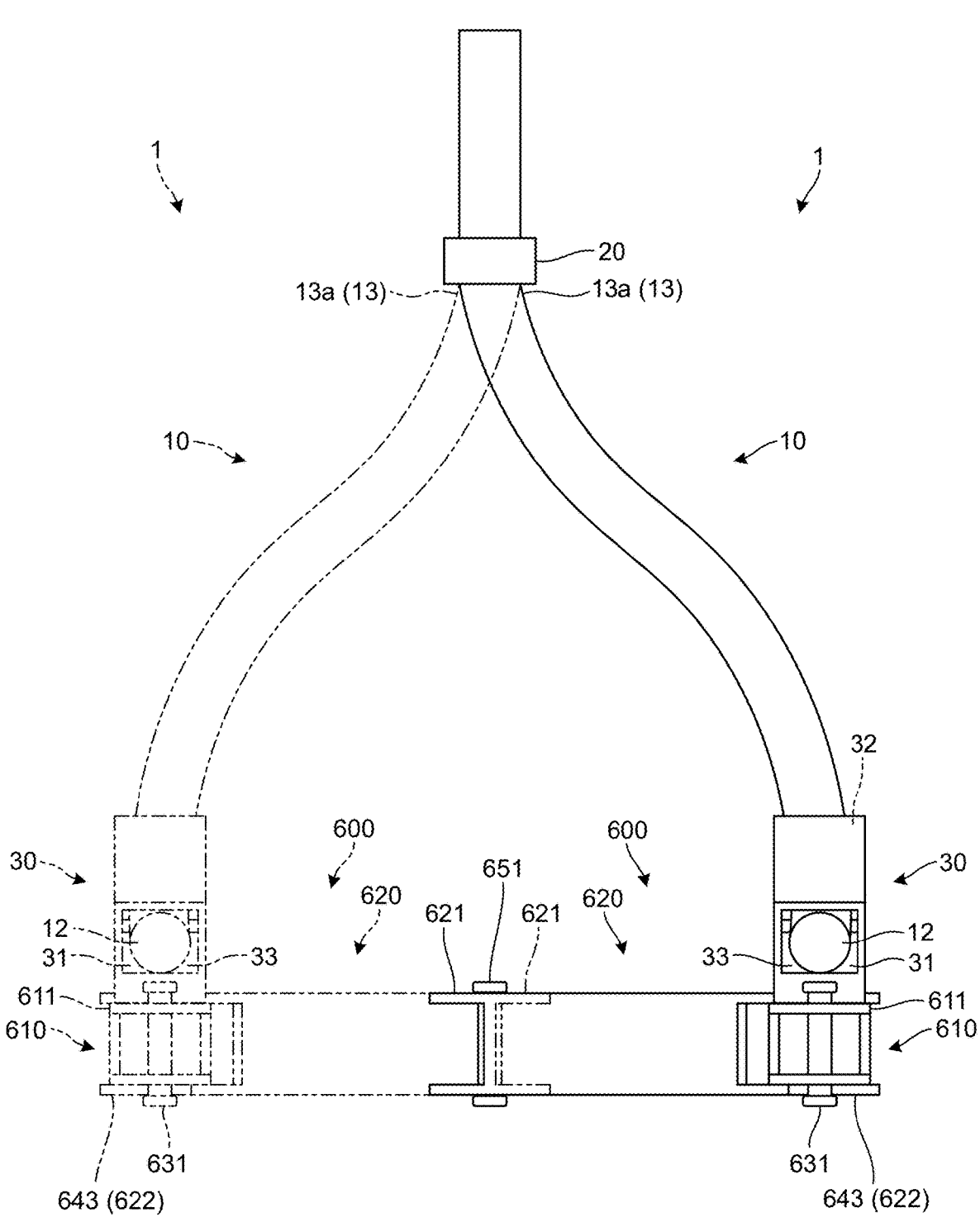
FIG. 4 is a plan diagram describing bending deformation of the third routed portion.

In addition, when performing the first relative rotation operation, the link mechanism 600 may relatively rotate the first coupling target 510 and the first arm member 610 about the axis of the first rotation shaft 631 with respect to each other, may relatively rotate the first arm member 610 and the second arm member 620 about the axis of the second rotation shaft 641 with respect to each other, and may relatively rotate the second coupling target 520 and the second arm member 620 about the axis of the third rotation shaft 651 with respect to each other (FIGS. 3 and 4). In this manner, the link mechanism 600 relatively rotates the first arm member 610 and the second arm member 620 about the axis of the first rotation shaft 631 with respect to the first coupling target 510.

Further, the link mechanism 600 can change the relative positions of the first coupling target 510 and the second coupling target 520 by relatively rotating the second coupling target 520 and the second arm member 620 about the axis of the third rotation shaft 651 with respect to each other and relatively rotating the second arm member 620 about the axis of the third rotation shaft 651 with respect to the second coupling target 520. Hereinafter, the operation of the link mechanism 600 is referred to as "second relative rotation operation".

For example, when performing the second relative rotation operation, the link mechanism 600 relatively rotates the second coupling target 520 and the second arm member 620 about the axis of the third rotation shaft 651 with respect to each other, does not relatively rotate the first arm member 610 and the second arm member 620 about the axis of the second rotation shaft 641 with respect to each other, and does not relatively rotate the first coupling target 510 and the first arm member 610 about the axis of the first rotation shaft 631 with respect to each other. In this manner, the link mechanism 600 relatively rotates the first arm member 610 and the second arm member 620 about the axis of the third rotation shaft 651 with respect to the second coupling target 520.

In addition, when performing the second relative rotation operation, the link mechanism 600 may relatively rotate the second coupling target 520 and the second arm member 620 about the axis of the third rotation shaft 651 with respect to each other, may relatively rotate the first arm member 610 and the second arm member 620 about the axis of the second rotation shaft 641 with respect to each other, and may not relatively rotate the first coupling target 510 and the first arm member 610 about the axis of the first rotation shaft 631 with respect to each other. In this manner, the link mechanism 600 relatively rotates the first arm member 610 and the second arm member 620 about the axis of the third rotation shaft 651 with respect to the second coupling target 520.

In addition, when performing the second relative rotation operation, the link mechanism 600 may relatively rotate the first coupling target 510 and the first arm member 610 about the axis of the first rotation shaft 631 with respect to each other, may relatively rotate the second coupling target 520 and the second arm member 620 about the axis of the third rotation shaft 651 with respect to each other, and may not relatively rotate the first arm member 610 and the second arm member 620 about the axis of the second rotation shaft 641 with respect to each other. In this manner, the link mechanism 600 relatively rotates the first arm member 610 and the second arm member 620 about the axis of the third rotation shaft 651 with respect to the second coupling target 520.

In addition, when performing the second relative rotation operation, the link mechanism 600 may relatively rotate the first coupling target 510 and the first arm member 610 about the axis of the first rotation shaft 631 with respect to each other, may relatively rotate the first arm member 610 and the second arm member 620 about the axis of the second rotation shaft 641 with respect to each other, and may relatively rotate the second coupling target 520 and the second arm member 620 about the axis of the third rotation shaft 651 with respect to each other (FIGS. 3 and 4). In this manner, the link mechanism 600 relatively rotates the first arm member 610 and the second arm member 620 about the axis of the third rotation shaft 651 with respect to the second coupling target 520.

The wire harness 1 includes a harness body 10 as a routing component that electrically connects the first electrical connection target 511 and the second electrical connection target 521 (FIGS. 1 to 5). The harness body 10 may include only an electric wire bundle obtained by bundling a plurality of electric wires, the entire electric wire bundle may be covered with an exterior component such as a corrugated tube, or the electric wire bundle may be partially covered with one or a plurality of exterior components. In addition, the wire harness 1 may include a communication line for exchanging signals between the first coupling target 510 side and the second coupling target 520 side.

In the wire harness 1, one terminal of the harness body 10 is electrically connected directly or indirectly to the first electrical connection target 511, and an other terminal of the harness body 10 is electrically connected directly or indirectly to the second electrical connection target 521. For example, the wire harness 1 includes a first connector (not illustrated) that is assembled to the one terminal of the harness body 10 and electrically connects the harness body 10 to the first electrical connection target 511 directly or indirectly, and a second connector (not illustrated) that is assembled to the other terminal of the harness body 10 and electrically connects the harness body 10 to the second electrical connection target 521 directly or indirectly.

The harness body 10 includes a first routed portion 11 routed in the link mechanism 600, a second routed portion 12 routed on the first coupling target 510 side with respect to the first routed portion 11, and a third routed portion 13 routed on the second coupling target 520 side with respect to the first routed portion 11 (FIGS. 1, 3, and 5).

The first routed portion 11 is routed to the other end portion 612 of the first arm member 610 (FIGS. 1, 3, and 5). For example, the first routed portion 11 is routed to the other end portion 612 of the first arm member 610 along the first arm member 610. The first routed portion 11 illustrated here is disposed along the first arm member 610 over between the one end portion 611 and the other end portion 612. The first routed portion 11 may be fixed to the first arm member 610 at the one end portion 611 thereof using a harness fixing tool (hereinafter, referred to as an "arm-side fixing tool") (not illustrated), or may not be fixed at the one end portion 611 in such a manner. Note that the arm-side fixing tool is, for example, a clamp or a clip provided with holding shapes with respect to the first routed portion 11 and the first arm member 610 (for example, a portion formed in a flat plate shape), a resin tape that winds the first routed portion 11 and the first arm member 610 together, or the like.

The second routed portion 12 is, for example, a portion routed on the first coupling target 510 side with respect to the one end portion 611 in a case where the first routed portion 11 is routed over between the one end portion 611 and the other end portion 612 of the first arm member 610 in the harness body 10. In the harness body 10, the terminal of the second routed portion 12 is electrically connected directly or indirectly to the first electrical connection target 511 on the first coupling target 510 side. Then, the second routed portion 12 is directly or indirectly fixed to the first coupling target 510. A harness fixing tool (hereinafter, referred to as a "first harness fixing tool") (not illustrated) is used to fix the second routed portion 12. The first harness fixing tool is, for example, a clamp or a clip, or the like, provided with holding shapes with respect to the second routed portion 12 and the first coupling target 510 or a component (for example, a portion formed in a flat plate shape) fixed to the first coupling target 510.

In addition, the third routed portion 13 in this case is a portion routed on the second coupling target 520 side with respect to the other end portion 612 of the first arm member 610 in the harness body 10. In the harness body 10, the terminal of the third routed portion 13 is electrically connected directly or indirectly to the second electrical connection target 521.

The third routed portion 13 is fixed to a fixed portion 522 on the second coupling target 520 side provided so as not to cause relative displacement with respect to the second coupling target 520 between the terminal on the second electrical connection target 521 side and the end portion on the first routed portion 11 side (FIGS. 1, 3, and 5). The fixed portion 522 on the second coupling target 520 side may be a part provided on the second coupling target 520, or may be a part provided on another member fixed without relative displacement with respect to the second coupling target 520. The link mechanism 600 includes a harness fixing tool (hereinafter, referred to as a "second harness fixing tool") 20 that fixes a fixing portion 13*a* (FIGS. 1, 3, and 5) between a terminal of the third routed portion 13 on the second electrical connection target 521 side and an end portion of the third routed portion 13 on the first routed portion 11 side to the fixed portion 522 on the second coupling target 520

Figure 2:
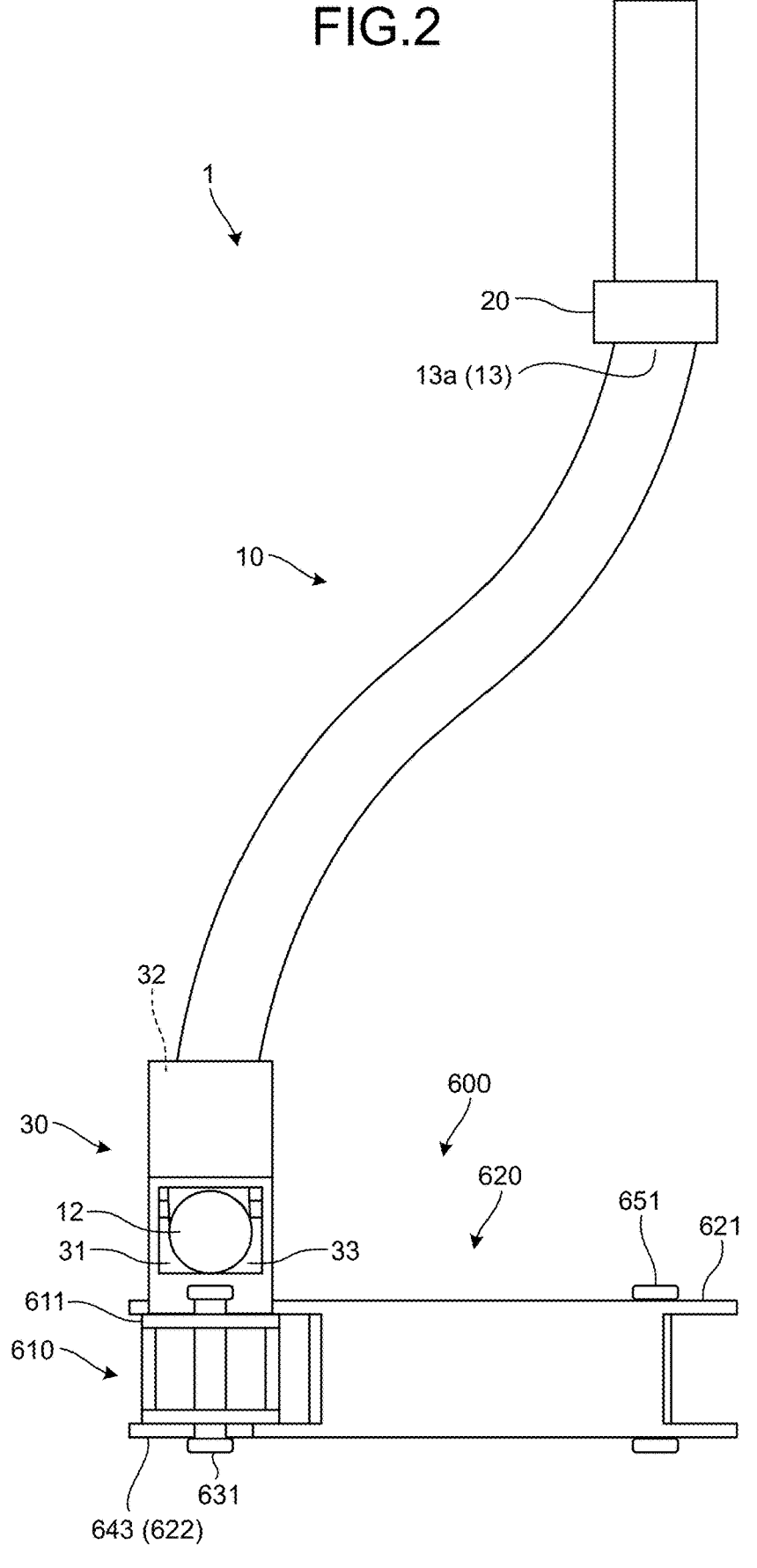
FIG. 2 is a plan diagram of the wire harness of the embodiment as viewed from a lead-in port side together with the link mechanism.

8 side (FIGS. 2 and 4). The second harness fixing tool 20 is, for example, a clamp or a clip provided with holding shapes with respect to the fixing portion 13*a* of the third routed portion 13 and the fixed portion 522 such as a through-hole provided in the second coupling target 520 (for example, a portion formed in a flat plate shape).

Further, the link mechanism 600 includes a harness guide tool 30 that is fixed to the other end portion 612 of the first arm member 610 and restricts the routing path of the third routed portion 13 (FIGS. 1 to 5). The harness guide tool 30 is a guide member that guides the third routed portion 13 toward the fixed portion 522 on the second coupling target 520 side located in a direction intersecting the operation plane of the link mechanism 600 with respect to itself. The harness guide tool 30 is fixed without relative displacement with respect to the other end portion 612 of the first arm member 610, and guides the third routed portion 13 from the end portion on the first routed portion 11 side toward the fixed portion 522 on the second coupling target 520 side.

As described above, the third routed portion 13 has an end portion on the first routed portion 11 side that is restrained at the arrangement place of the harness guide tool 30 that follows the movement and position of the first arm member 610 and the fixing portion 13*a* that is restrained at the position of the fixed portion 522 on the second coupling target 520 side. Thus, the third routed portion 13 can be bent and deformed between the harness guide tool 30 and the fixing portion 13*a* when the link mechanism 600 performs the relative rotation operation of either the first relative rotation operation or the second relative rotation operation described above (FIGS. 3 and 4). For example, the third routed portion 13 can be bent and deformed between the harness guide tool 30 and the fixing portion 13*a* when the first arm member 610 is relatively rotated about the axis of the first rotation shaft 631 with respect to the first coupling target 510 or when the second arm member 620 is relatively rotated about the axis of the third rotation shaft 651 with respect to the second coupling target 520. In addition, the third routed portion 13 can be bent and deformed between the harness guide tool 30 and the fixing portion 13*a* when the first arm member 610 is relatively rotated about the axis of the first rotation shaft 631 with respect to the first coupling target 510 and the second arm member 620 is relatively rotated about the axis of the third rotation shaft 651 with respect to the second coupling target 520. Then, the third routed portion 13 can be twisted and deformed about its own axis between the harness guide tool 30 and the fixing portion 13*a* when the first arm member 610 and the second arm member 620 are relatively rotated with respect to each other about the axis of the second rotation shaft 641 (FIGS. 3 to 5). That is, when the wire harness 1 of the present embodiment deforms the third routed portion 13 in accordance with the movement of the link mechanism 600 as described above, the harness body 10 can follow the movement of the link mechanism 600 without overload.

For example, the harness guide tool 30 includes a lead-in port 31 through which the first routed portion 11 routed to the other end portion 612 of the first arm member 610 along the first arm member 610 is led in, a lead-out port 32 through which the third routed portion 13 is led out and directed toward the fixed portion 522 on the second coupling target 520 side, and a guide space 33 that guides the first routed portion 11 led in from the lead-in port 31 and guides the third routed portion 13 to the lead-out port 32 (FIGS. 1 to 5). A main body of the harness guide tool 30 illustrated here is formed in an L-shaped cylindrical shape, and an internal space thereof is used as an L-shaped guide space 33 for guiding the first routed portion 11 and the third routed portion 13. Then, the harness guide tool 30 opens the lead-out port 32 in an axial direction of the first rotation shaft 631 and the second rotation shaft 641, and directs the third routed portion 13 toward the fixed portion 522 on the second coupling target 520 side present ahead of the lead-out port 32.

For example, here, a gap is provided between the lead-in port 31 and the first routed portion 11 so that the first routed portion 11 can move in the lead-in port 31, and a gap is provided between the guide space 33 and the first routed portion 11 so that the first routed portion 11 can move in the guide space 33, thereby reducing a load applied to the first routed portion 11 when the link mechanism 600 operates. In addition, for example, here, a gap is provided between the lead-out port 32 and the third routed portion 13 so that the third routed portion 13 can move in the lead-out port 32, and a gap is provided between the guide space 33 and the third routed portion 13 so that the third routed portion 13 can move in the guide space 33, thereby reducing a load applied to the third routed portion 13 when the link mechanism 600 operates. Accordingly, the harness guide tool 30 also reduces a load applied to the third routed portion 13 when the third routed portion 13 is deformed.

In a case where the fixed portion 522 on the second coupling target 520 side is provided ahead in the opening direction of the lead-out port 32, for example, when the link mechanism 600 is at a certain operation position within the operation range, the portion is provided in a direction orthogonal to the operation plane of the link mechanism 600 with respect to the link mechanism 600 (that is, immediately above the link mechanism 600). For example, the fixed portion 522 is provided in a direction orthogonal to the operation plane of the link mechanism 600 with respect to the harness guide tool 30 at the operation position. The harness guide tool 30 guides the third routed portion 13 toward the fixed portion 522 on the second coupling target 520 side present immediately above the lead-out port 32 at the operation position. As described above, in the wire harness 1, by providing the fixed portion 522 on the second coupling target 520 side in a direction orthogonal to the operation plane of the link mechanism 600 with respect to the link mechanism 600, it is possible to suppress an increase in the deformation amount in the bending deformation or the twisting deformation of the third routed portion 13 in accordance with the movement of the link mechanism 600, and thus, it is possible to reduce the load applied to the third routed portion 13.

In the wire harness according to the present embodiment, a third routed portion has an end portion on a first routed portion side that is restrained at the arrangement place of a harness guide tool that follows the movement and position of a first arm member and a fixing portion that is restrained at the position of a fixed portion on a second coupling target side. Thus, since the wire harness can deform the third routed portion in accordance with the movement of the link mechanism, the harness body can follow the movement of the link mechanism without overload.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness comprising:
a harness body that includes a first routed portion routed in a link mechanism that couples a first coupling target and a second coupling target, a second routed portion routed on the first coupling target side with respect to the first routed portion, and a third routed portion routed on the second coupling target side with respect to the first routed portion;
a harness fixing tool that fixes a fixing portion of the third routed portion to a fixed portion on the second coupling target side provided so as not to cause relative displacement with respect to the second coupling target; and
a harness guide tool that restricts a routing path of the third routed portion, wherein
the link mechanism includes a first arm member having one end portion coupled to the first coupling target side and an other end portion at which the first routed portion is routed, a second arm member having one end portion coupled to the second coupling target side, a first rotation shaft that enables relative rotation between the first coupling target and the one end portion of the first arm member, a second rotation shaft that is parallel to the first rotation shaft and enables relative rotation between the other end portion of the first arm member to which the harness guide tool is fixed and an other end portion of the second arm member, and a third rotation shaft that is parallel to the first rotation shaft and the second rotation shaft and enables relative rotation between the second coupling target and the one end portion of the second arm member, and enables relative displacement between the first coupling target and the second coupling target along an orthogonal plane with respect to the first rotation shaft, the second rotation shaft, and the third rotation shaft,
the harness guide tool guides the third routed portion toward the fixed portion on the second coupling target side located in a direction intersecting the orthogonal plane with respect to the harness guide tool, and
the third routed portion is bent and deformed between the harness guide tool and the fixing portion when the first arm member is relatively rotated about an axis of the first rotation shaft with respect to the first coupling target.

2. The wire harness according to claim 1, wherein
the third routed portion is bent and deformed between the harness guide tool and the fixing portion when the first arm member is relatively rotated about an axis of the first rotation shaft with respect to the first coupling target and the second arm member is relatively rotated about an axis of the third rotation shaft with respect to the second coupling target.

3. The wire harness according to claim 2, wherein
the third routed portion is twisted and deformed about an axis of the third routed portion between the harness guide tool and the fixing portion when the first arm member and the second arm member are relatively rotated with respect to each other about an axis of the second rotation shaft.

4. The wire harness according to claim 3, wherein
the harness guide tool includes a lead-in port through which the first routed portion routed to the other end portion of the first arm member along the first arm member is led in, a lead-out port through which the third routed portion is led out and directed toward the fixed portion on the second coupling target side, and a guide space that guides the first routed portion led in from the lead-in port and guides the third routed portion to the lead-out port.

5. The wire harness according to claim 1, wherein
the third routed portion is twisted and deformed about an
axis of the third routed portion between the harness
guide tool and the fixing portion when the first arm
member and the second arm member are relatively
rotated with respect to each other about an axis of the
second rotation shaft.

6. The wire harness according to claim 2, wherein
the harness guide tool includes a lead-in port through
which the first routed portion routed to the other end
portion of the first arm member along the first arm
member is led in, a lead-out port through which the
third routed portion is led out and directed toward the
fixed portion on the second coupling target side, and a
guide space that guides the first routed portion led in
from the lead-in port and guides the third routed portion
to the lead-out port.

7. The wire harness according to claim 5, wherein
the harness guide tool includes a lead-in port through
which the first routed portion routed to the other end
portion of the first arm member along the first arm
member is led in, a lead-out port through which the
third routed portion is led out and directed toward the
fixed portion on the second coupling target side, and a
guide space that guides the first routed portion led in
from the lead-in port and guides the third routed portion
to the lead-out port.

8. The wire harness according to claim 1, wherein
the harness guide tool includes a lead-in port through
which the first routed portion routed to the other end
portion of the first arm member along the first arm
member is led in, a lead-out port through which the
third routed portion is led out and directed toward the
fixed portion on the second coupling target side, and a
guide space that guides the first routed portion led in
from the lead-in port and guides the third routed portion
to the lead-out port.

9. A wire harness comprising:
a harness body that includes a first routed portion routed
in a link mechanism that couples a first coupling target
and a second coupling target, a second routed portion
routed on the first coupling target side with respect to
the first routed portion, and a third routed portion
routed on the second coupling target side with respect
to the first routed portion;
a harness fixing tool that fixes a fixing portion of the third
routed portion to a fixed portion on the second coupling
target side provided so as not to cause relative displace-
ment with respect to the second coupling target; and
a harness guide tool that restricts a routing path of the
third routed portion, wherein
the link mechanism includes a first arm member having
one end portion coupled to the first coupling target side
and an other end portion at which the first routed
portion is routed, a second arm member having one end
portion coupled to the second coupling target side, a
first rotation shaft that enables relative rotation between
the first coupling target and the one end portion of the
first arm member, a second rotation shaft that is parallel
to the first rotation shaft and enables relative rotation
between the other end portion of the first arm member
to which the harness guide tool is fixed and an other end
portion of the second arm member, and a third rotation
shaft that is parallel to the first rotation shaft and the
second rotation shaft and enables relative rotation
between the second coupling target and the one end
portion of the second arm member, and enables relative displacement between the first coupling target and the
second coupling target along an orthogonal plane with
respect to the first rotation shaft, the second rotation
shaft, and the third rotation shaft,
the harness guide tool guides the third routed portion
toward the fixed portion on the second coupling target
side located in a direction intersecting the orthogonal
plane with respect to the harness guide tool, and
the third routed portion is bent and deformed between the
harness guide tool and the fixing portion when the
second arm member is relatively rotated about an axis
of the third rotation shaft with respect to the second
coupling target.

10. The wire harness according to claim 9, wherein
the third routed portion is bent and deformed between the
harness guide tool and the fixing portion when the first
arm member is relatively rotated about an axis of the
first rotation shaft with respect to the first coupling
target and the second arm member is relatively rotated
about an axis of the third rotation shaft with respect to
the second coupling target.

11. The wire harness according to claim 10, wherein
the third routed portion is twisted and deformed about an
axis of the third routed portion between the harness
guide tool and the fixing portion when the first arm
member and the second arm member are relatively
rotated with respect to each other about an axis of the
second rotation shaft.

12. The wire harness according to claim 11, wherein
the harness guide tool includes a lead-in port through
which the first routed portion routed to the other end
portion of the first arm member along the first arm
member is led in, a lead-out port through which the
third routed portion is led out and directed toward the
fixed portion on the second coupling target side, and a
guide space that guides the first routed portion led in
from the lead-in port and guides the third routed portion
to the lead-out port.

13. The wire harness according to claim 10, wherein
the harness guide tool includes a lead-in port through
which the first routed portion routed to the other end
portion of the first arm member along the first arm
member is led in, a lead-out port through which the
third routed portion is led out and directed toward the
fixed portion on the second coupling target side, and a
guide space that guides the first routed portion led in
from the lead-in port and guides the third routed portion
to the lead-out port.

14. The wire harness according to claim 9, wherein
the third routed portion is twisted and deformed about an
axis of the third routed portion between the harness
guide tool and the fixing portion when the first arm
member and the second arm member are relatively
rotated with respect to each other about an axis of the
second rotation shaft.

15. The wire harness according to claim 14, wherein
the harness guide tool includes a lead-in port through
which the first routed portion routed to the other end
portion of the first arm member along the first arm
member is led in, a lead-out port through which the
third routed portion is led out and directed toward the
fixed portion on the second coupling target side, and a
guide space that guides the first routed portion led in
from the lead-in port and guides the third routed portion
to the lead-out port.

16. The wire harness according to claim 9, wherein
the harness guide tool includes a lead-in port through
    which the first routed portion routed to the other end
    portion of the first arm member along the first arm
    member is led in, a lead-out port through which the  5
    third routed portion is led out and directed toward the
    fixed portion on the second coupling target side, and a
    guide space that guides the first routed portion led in
    from the lead-in port and guides the third routed portion
    to the lead-out port.                                  10

*    *    *    *    *